United States Patent [19]
Koyanagi et al.

[11] Patent Number: 5,352,882
[45] Date of Patent: Oct. 4, 1994

[54] FOCUS ADJUSTING DEVICE FOR ZOOM LENS ASSEMBLY

[75] Inventors: Masakazu Koyanagi, Chiba; Tatsuo Fujikawa, Saitama; Hiroyuki Takahashi, Kanagawa, all of Japan

[73] Assignee: Sony Corporation, Japan

[21] Appl. No.: 19,901

[22] Filed: Feb. 19, 1993

[30] Foreign Application Priority Data

Feb. 25, 1992 [JP] Japan ................... 4-073473

[51] Int. Cl.⁵ ............................... G01J 1/20
[52] U.S. Cl. ................... 250/201.7; 354/400
[58] Field of Search .............. 250/201.4, 201.7, 201.8, 250/216; 356/1, 4; 354/402, 403, 406, 407, 408, 400

[56] References Cited
U.S. PATENT DOCUMENTS
4,920,420  4/1990  Sano et al. ............... 250/201.4
5,027,147  6/1991  Kaneda .
5,113,214  5/1992  Nagata et al. .

FOREIGN PATENT DOCUMENTS
0439219  7/1991  European Pat. Off. .
2653929  6/1977  Fed. Rep. of Germany .
4143061  7/1992  Fed. Rep. of Germany .

OTHER PUBLICATIONS
Patent Abstracts of Japan vol. 7, No. 176 (P-214) 4 Aug. 1983 & JP-A-58 079 223 (Fuji Shashin Koki KK).

*Primary Examiner*—David C. Nelms
*Attorney, Agent, or Firm*—Ronald P. Kananen

[57] ABSTRACT

A focus adjusting device for flange back adjustment of an inner focus lens assembly including a zoom lens, a focus lens, and a compensator lens, comprises: driving means for driving the zoom lens; zoom lens position detecting means for detecting information on position of the zoom lens; focus lens driving means for driving the focus lens; focal condition detecting means for detecting a focal condition; and computing means for computing an optical end of the focus lens by using information obtained previously on a ratio between the distance from one to the other of opposite mechanical ends of the zoom lens and the distance from one to the other of opposite optical ends of the zoom lens.

6 Claims, 8 Drawing Sheets

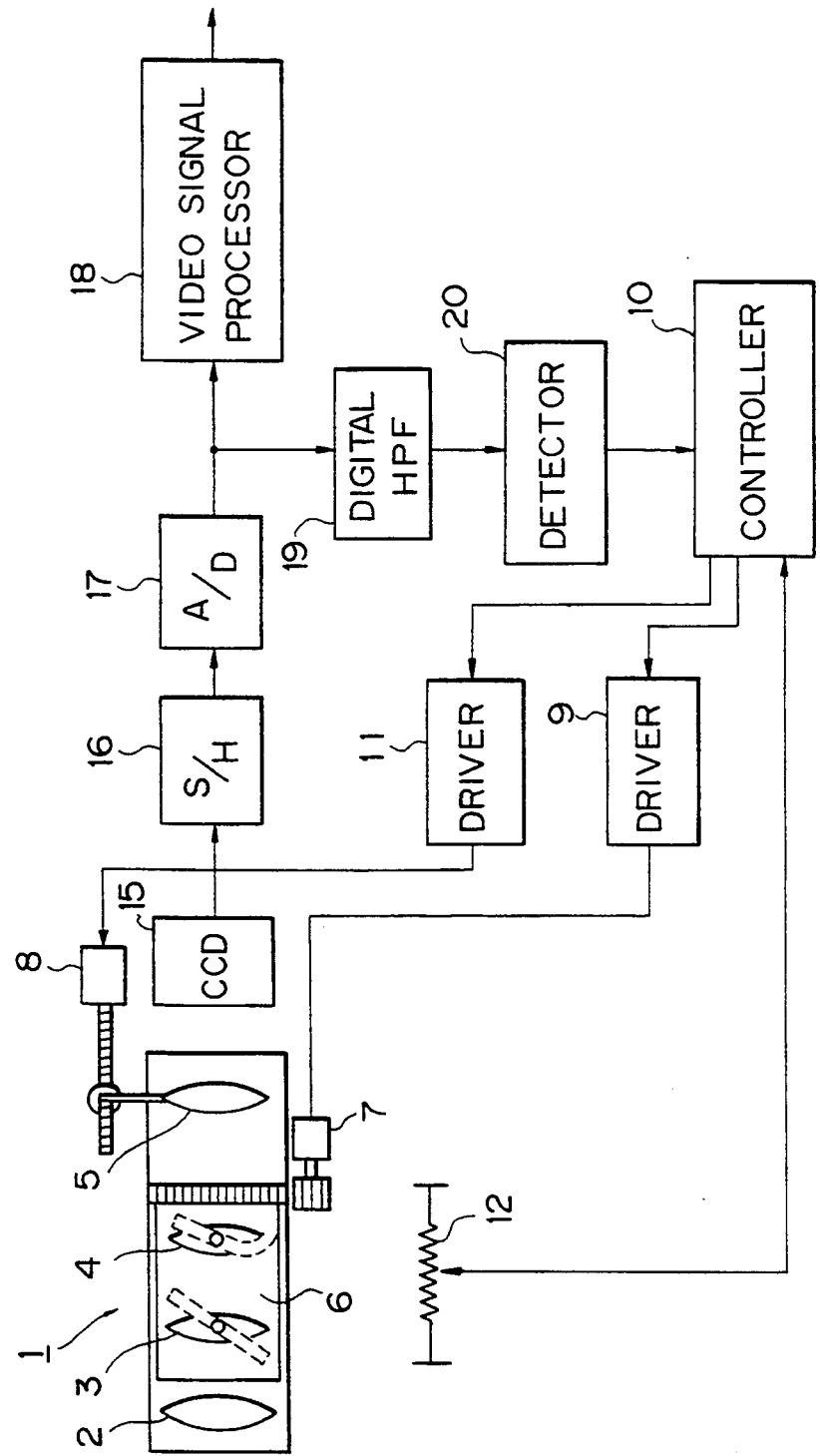

FOCUS ADJUSTING DEVICE FOR ZOOM LENS ASSEMBLY

BACKGROUND OF THE INVENTION

Field of the Invention

This invention relates to a focus adjusting device for flange back adjustment of an inner focus lens assembly having a compensator lens.

Description of the Prior Art

In an inner focus lens assembly whose front lens is fixed, when a zoom lens is moved, focal position for a focus lens varies with movement of the zoom lens. To cope with the variation, in existing video cameras using such inner focus lens assemblies, information on changes in focal position for the focus lens with movements of the zoom lens is stored in memory as mapping data. A curve indicating changes in focal position of the focus lens with movements of the zoom lens is called a tracking curve. When the zoom lens is moved, position of the focus lens is controlled in accordance with the data in the form of the tracking curve stored in the memory. Thereby, even when the zoom lens is moved, focalization is maintained. Such control is called zoom tracking control.

In existing video cameras equipped with such an inner focus lens assembly as described above, a tracking curve is stored as mapping data in memory to control position of the focus lens in accordance with the tracking curve when the zoom lens is moved. Although the tracking curve is previously prepared, a difference occurs between an actual tracking curve and the designed tracking curve stored as mapping data, because of a lens mounting error or the like. For correcting the difference, flange back adjustment is executed in existing video cameras having an inner focus lens assembly.

FIGS. 1 and 2 are views for illustrating flange back adjustment in an existing video camera which does not include a compensator lens. FIG. 1 is a flow chart of existing flange back adjustment, and FIG. 2 illustrates movements of the lenses in respective steps. In FIG. 2, respective reference numerals correspond to movements of the lenses in respective steps. Still in FIG. 2, the abscissa indicates position of the zoom lens, and ordinate indicates position of the focus lens. In FIG. 2, reference numeral A11 refers to a tracking curve stored as mapping data, B11 refers to an actual tracking curve.

As shown in FIGS. 1 and 2, the zoom lens is first set at a position corresponding to a point of inflexion as designed (step ST101). The point of inflexion corresponds to a peak value of the tracking curve.

When the zoom lens is brought to the designed point of inflexion, the focus lens is controlled to move to a focal position. When the focus lens reaches the focal position, the present focal position is stored (step ST102).

After the focus lens reaches the focal position, it is moved by a predetermined amount T. The amount T is a designed value for movement of the focus lens from the point of inflexion to the telephoto end (step ST103).

When the focus lens reaches the telephoto end, the zoom lens is moved to a focal position, and the present focal position is stored as the telephoto end (step ST104).

The zoom lens is moved by a predetermined amount S. The amount S is a designed value for movement of the zoom lens from the point of inflexion to the telephoto end (step ST105).

When the zoom lens is moved, the focus lens is controlled to move to a focal position, and the present focal position is stored (step ST106).

The previous focal position for the focus lens stored in step ST102 is compared with the present focal position to determine whether a difference between the positions for the focus lens is within a predetermined value (step ST107).

If the difference between the previous and present focal positions for the focus lens does not reach the predetermined value, control returns to step ST103, and the same process is repeated until difference between former and present focal positions for the focus lens comes within the predetermined value.

When a difference between former and present focal positions for the focus lens comes within the predetermined value, the focus lens is moved from a wide end to the telephoto end by a designed moving amount for the focus lens (step ST108).

The zoom lens is moved to a focal position, and the position is stored as a wide end (step ST109).

Inner focus lens assemblies used in existing video cameras include a fixed front lens, a zoom lens, and a focus lens, but do not include a compensator lens. In inner focus lens assemblies including a compensator lens, a difference from a focal position occurring upon moving its zoom lens is compensated by moving the compensator lens by means of a mechanical cam.

In existing inner focus lens assemblies which do not include a compensator lens, the tracking curve has an essentially chevron like configuration as shown in FIG. 2, and includes a sharp curved portion. That is to say, the curve from the point of inflexion to the telephoto end is very sharp. Therefore, when the zoom lens is moved at a high speed, the focus lens cannot follow it. At the same time, in sharply curved position of the tracking curve, a focus error exceeds the depth of field unless positional accuracy of the focus lens is increased. As a result, it is still difficult to move the zoom lens at a high speed. Further, since the slope of the tracking curve becomes sharper as the magnification increases, lenses of high magnification cannot be used.

In contrast, in inner focus lens assemblies including a compensator lens, a difference from a focal position which occurs upon moving a zoom lens is compensated by moving the compensator lens through a mechanical cam, and the tracking curve is relatively flat as shown in FIG. 2. Therefore, even when the zoom lens is moved at a high speed, the focus lens can follow it. In addition, even when positional accuracy of the focus lens is not so high, it is easy to maintain the focal position within the depth of field.

In inner focus lens assemblies including a compensator lens, unlike the existing inner focus lenses which do not use a compensator lens, tracking curves do not include a point of inflexion, and flange back adjustment utilizing a point of inflexion is impossible. Moreover, unlike the existing inner focus lens assemblies not including a compensator lens, tracking curves are very moderate at their wide ends. Therefore, it is very difficult to find a focal position by moving the zoom lens on the wide end side.

OBJECTS AND SUMMARY OF THE INVENTION

It is therefore an object of the invention to provide a focus adjusting device that facilitates flange back adjustment in video cameras using an inner focus lens assembly including a compensator lens.

Another object of the invention is to provide a focus adjusting device that readily detects an actual wide end position.

According to an aspect of the invention, there is provided a focus adjusting device for flange back adjustment of an inner focus lens assembly including a zoom lens, a focus lens, and a compensator lens, comprising: driving means for driving the zoom lens; zoom lens position detecting means for detecting information on position of the zoom lens; focus lens driving means for driving the focus lens; focal condition detecting means for detecting a focal condition; and computing means for computing an optical end of the focus lens by using information obtained previously on a ratio between the distance from one to the other of opposite mechanical ends of the zoom lens and the distance from one to the other of opposite optical ends of the zoom lens.

A wide side optical end is obtained from a wide side mechanical end position of the zoom lens, a telephoto side mechanical end position of the zoom lens, and a ratio between a distance ($ZMT_R - ZMW_R$) from a designed wide side mechanical end position $ZMW_R$ to a designed telephoto side mechanical end position $ZMT_R$ and a distance ($ZOT_R - ZOW_R$) from a wide side optical end $ZOW_R$ to a designed telephoto side optical end $ZOT_R$ of the zoom lens. Thereby, flange back adjustment of a video camera using an inner focus lens assembly including a compensator lens can be automated.

The above, and other, objects, features and advantage of the present invention will become readily apparent from the following detailed description thereof which is to be read in connection with the accompanying drawings.

BRIEF DESCRIPTION OF THE DRAWINGS

FIG. 4 is a block diagram of an embodiment of the invention;

DETAILED DESCRIPTION OF THE PREFERRED EMBODIMENTS

Figure 1:
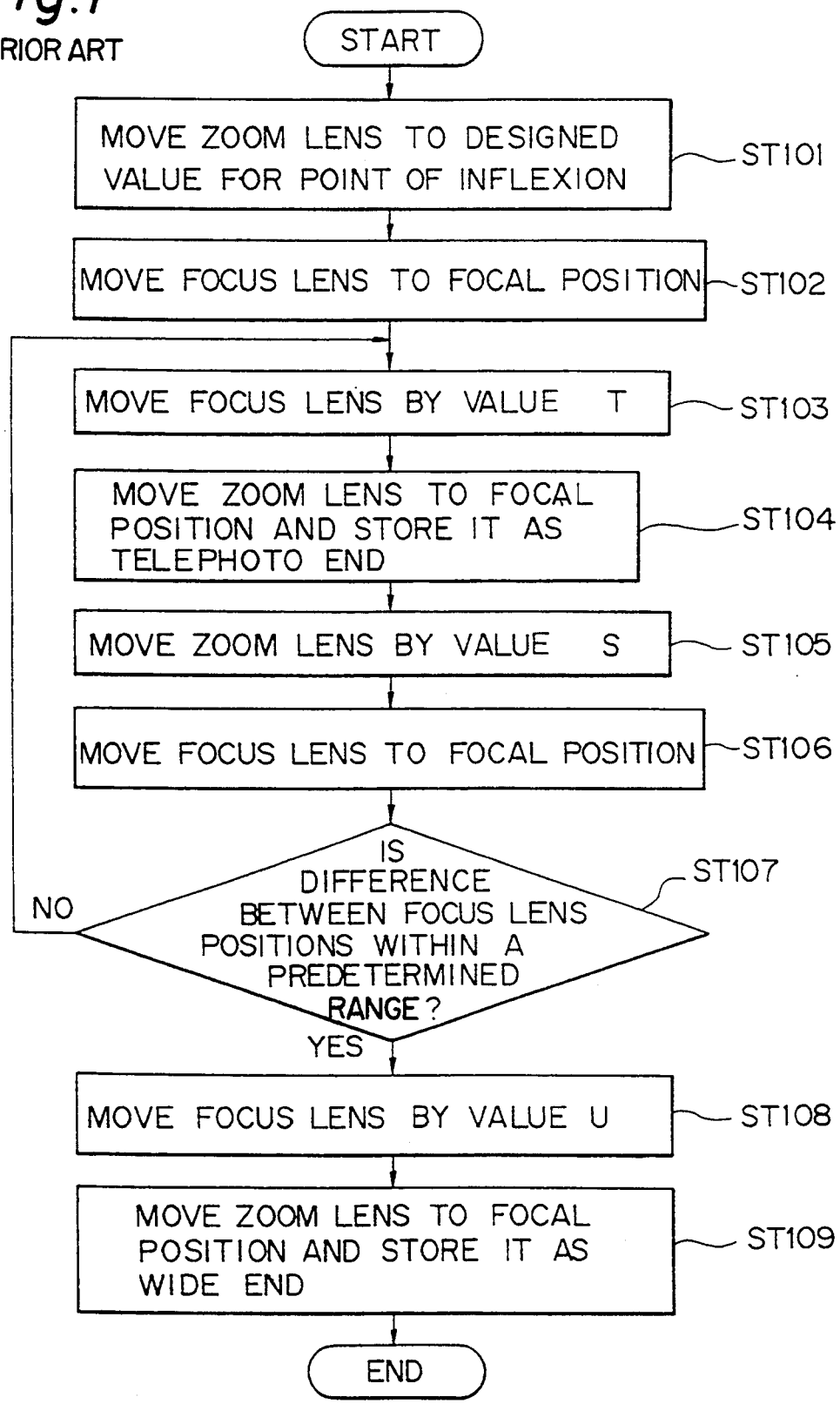
FIG. 1 is a flow chart used for explanation of existing flange back adjustment of an inner focus lens assembly having no compensator lens.
Figure 2:
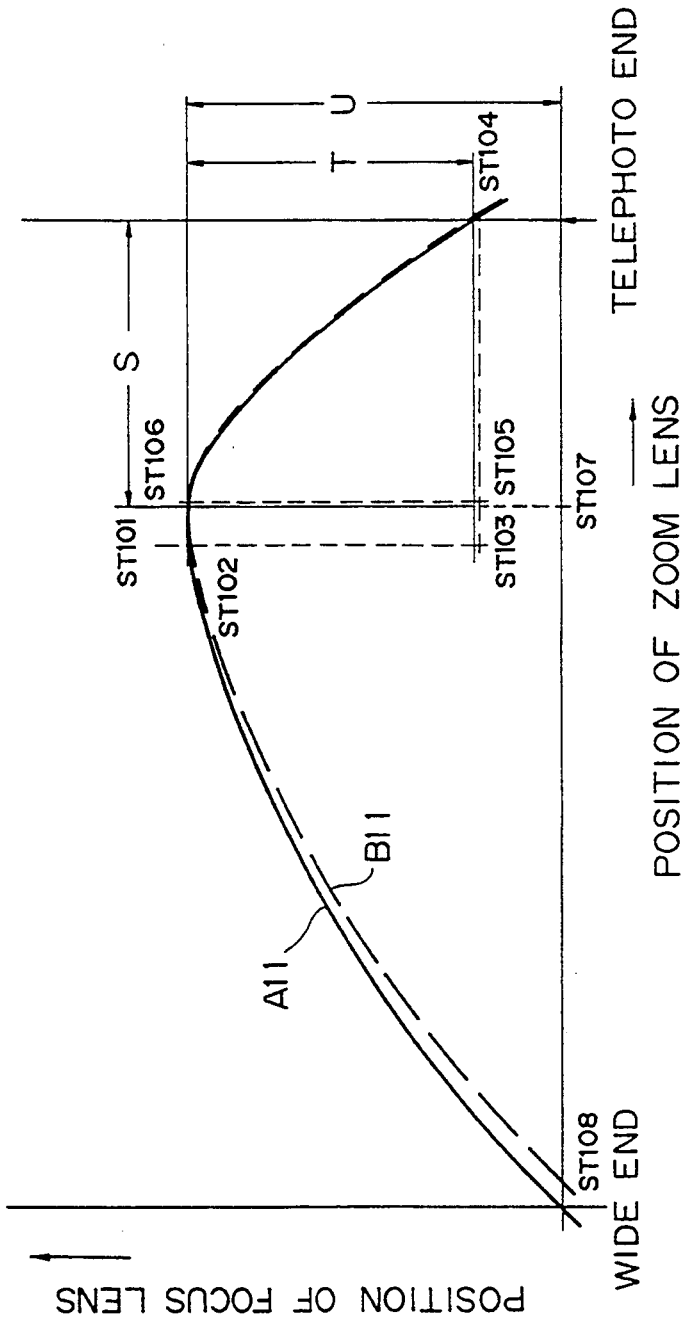
FIG. 2 is a graph used for explanation of the existing flange back adjustment of an inner focus lens assembly having no compensator lens.
Figure 3:
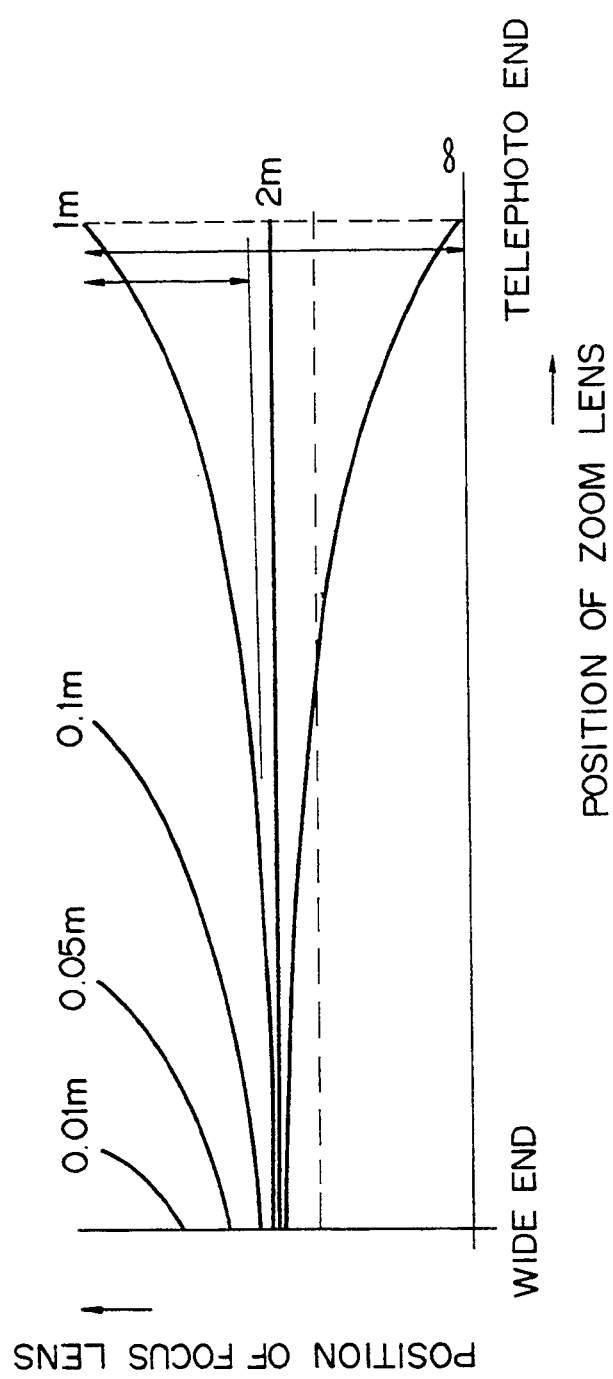
FIG. 3 is a graph used for explanation of flange back adjustment of an inner focus lens assembly having a compensator lens of the nature performed in accordance with the present invention.

An embodiment of the invention is explained below with reference to the drawings.

FIG. 4 shows an exemplary video camera to which the invention may be applied. In FIG. 4, reference numeral 1 denotes an inner focus lens assembly. The inner focus lens assembly 1 includes a fixed lens 2, a zoom lens 3, a compensator lens 4, and a focus lens 5.

The zoom lens 3 and the compensator lens 4 are attached to a cam lens barrel 6. When a DC motor 7 is driven, the zoom lens 3 and the compensator lens 4 attached to the cam lens barrel 6 are moved along a cam provided on the cam lens barrel 6. The focus lens 5 is moved by a step motor 8.

To the DC motor 7 is supplied a driving signal from a controller 10 through a driver 9. To the step motor 8 is supplied a driving signal from the controller 10 through a driver 11. In the video camera to which the invention is applied, since the inner focus lens assembly 1 having the compensator lens 4 is used, the zoom can be executed at an extra high speed.

A potentiometer 12 for detecting amount of movement of the zoom lens 3 is provided. From an output of the potentiometer 12 is obtained information on position of the zoom lens 3. The positional information of the zoom lens 3 is supplied to the controller 10. Since the focus lens 5 is moved by the step motor 8, information on position of the focus lens 5 can be obtained from the number of pulses applied to the step motor 8. For obtaining the initial value of the positional information of the focus lens 5, a photo interrupter, not shown, is provided in an appropriate position.

A figure of a subject sent through the inner focus lens assembly 1 is focused into an image on an image pickup surface of a CCD image pickup device 15. An output from the CCD image pickup device 15 is supplied to a sample and holding circuit 16. An output from the sample and holding circuit 16 is supplied to an A/D converter 17. The image signal is digitalized by the A/D converter 17. An output from the A/D converter 17 is supplied to a video signal processing circuit 18 and to a digital high pass filter 19. The video signal representing the image is processed.

In the digital high pass filter 19, an edge component of the image signal is extracted. The edge component of the image signal is supplied to a detecting circuit 20 which detects the level of the edge component in the image signal. An output from the detecting circuit 20 is supplied to the controller 10. As the condition approaches focalization, high band components increase in the image signal. Therefore, an estimated value of the degree of focalization is obtained from the output of the detecting circuit 20. The controller 10 obtains the estimated value of the degree of focalization on the basis of the output from the detecting circuit 20.

The controller 10 stores mapping data based on a tracking curve of the inner focus lens assembly 1 equipped with the compensator lens. When the zoom position is moved by moving the zoom lens 3 by the DC motor 7, the mapping data is read out, and position of the focus lens 5 is controlled in accordance with changes in the zoom position.

Figure 5A:
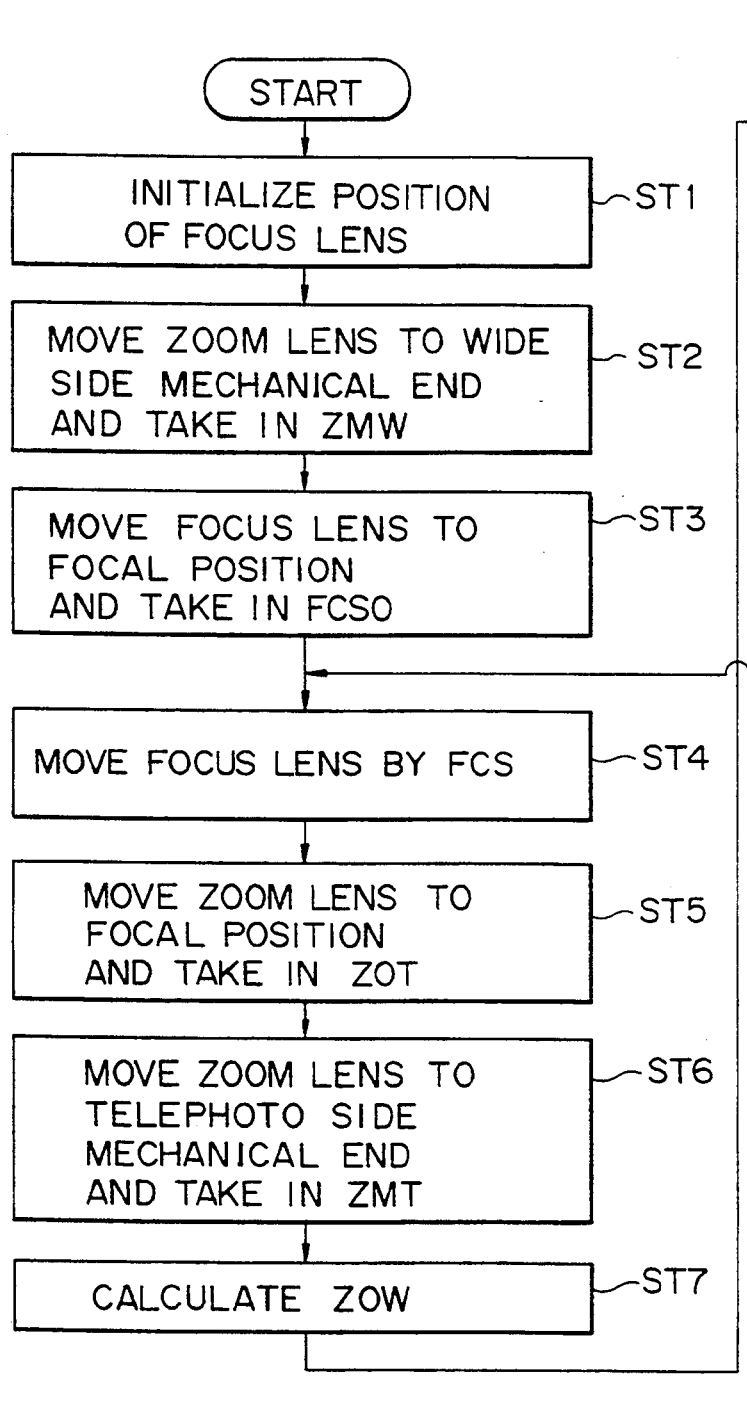
FIG. 5a and 5b show a flow chart used for explanation of the embodiment of the invention.
Figure 5B:
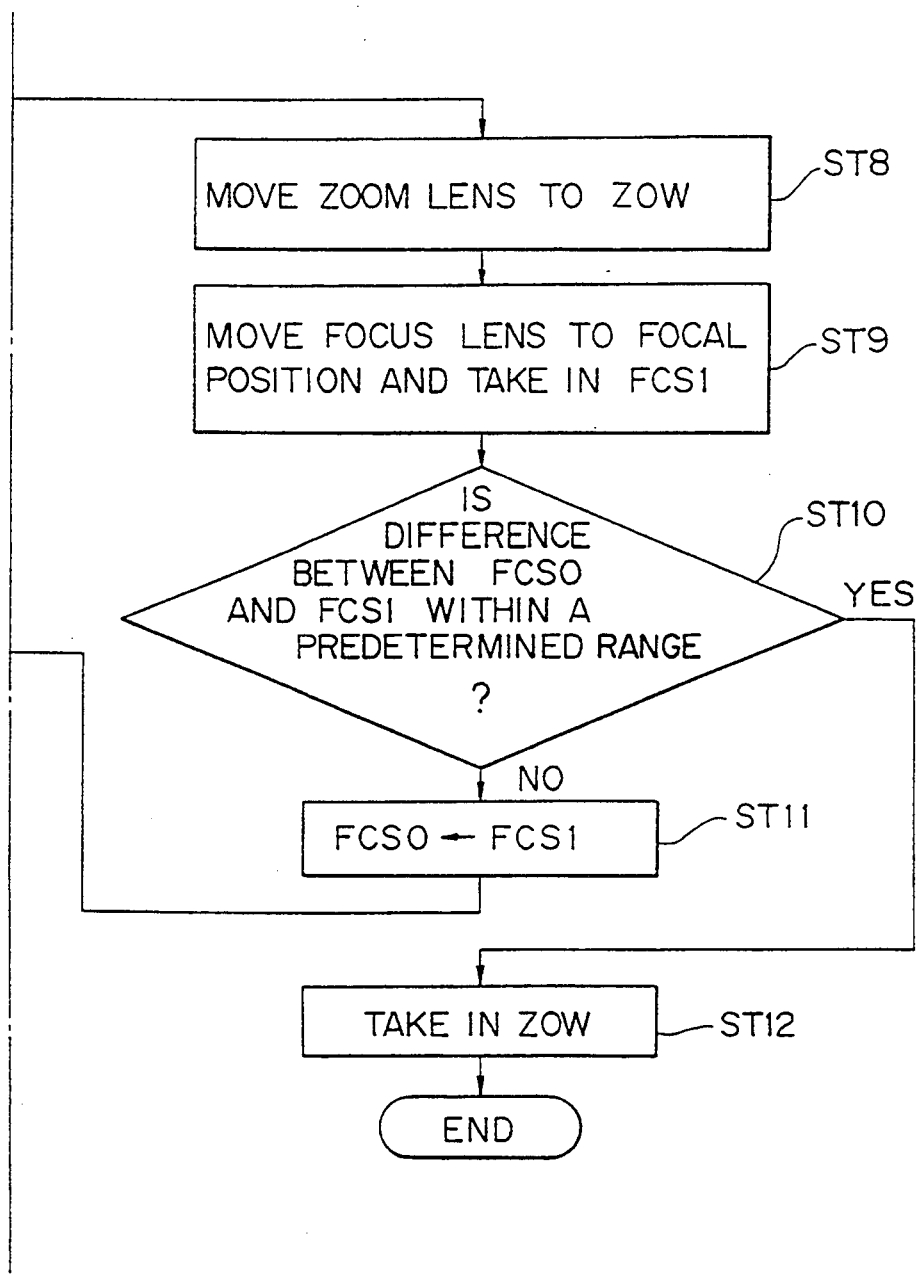
Figure 6:
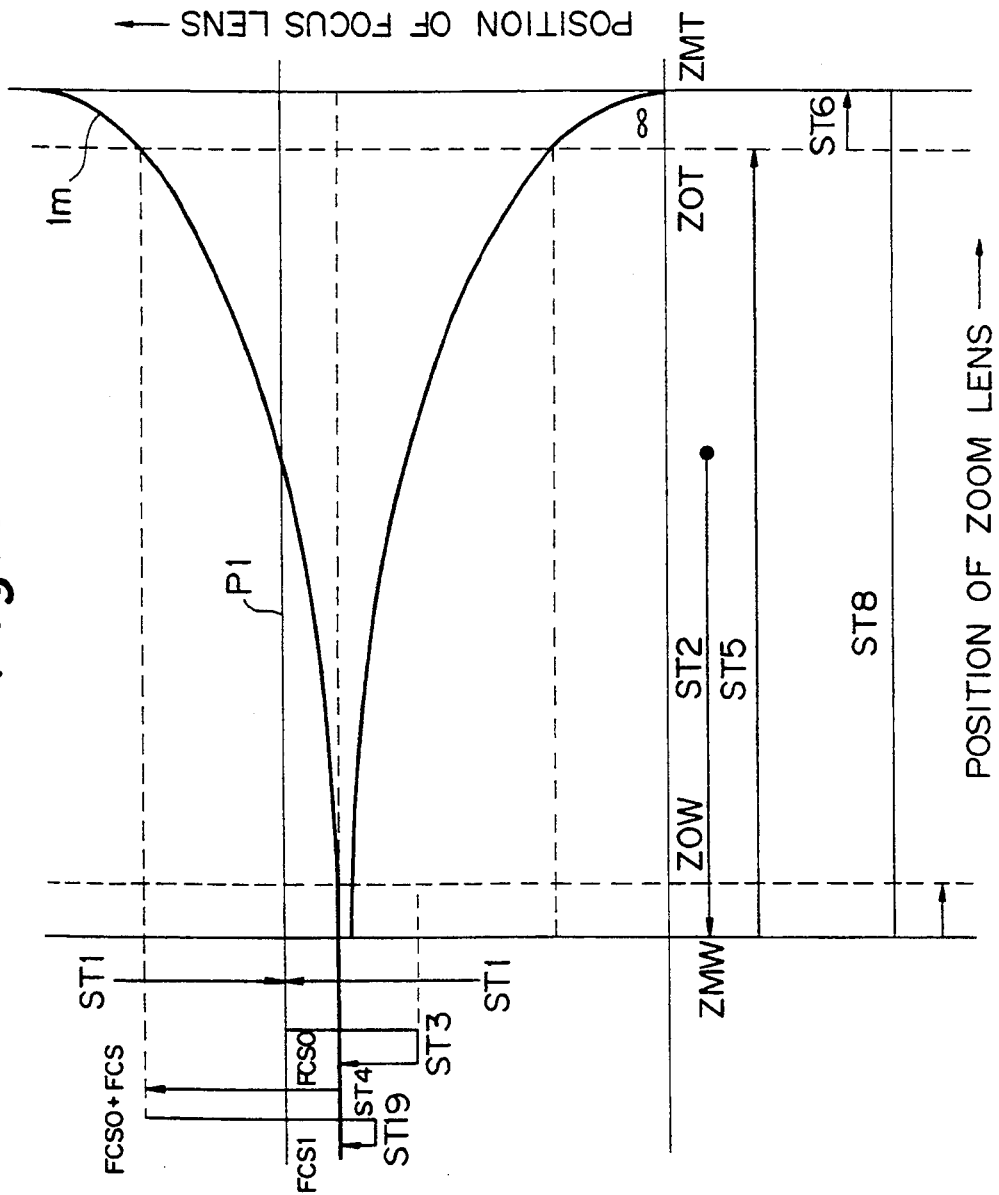
FIG. 6 is a graph used for explanation of the embodiment of the invention.

FIGS. 5 and 6 explain flange back adjustment in the inner focus lens assembly having a compensator lens. FIG. 5 is a flow chart of the flange back adjustment, and FIG. 6 explains movements of lenses in respective steps. In FIG. 6, respective reference numerals correspond to movements of lenses in respective steps. Still in FIG. 6, the abscissa indicates position of the zoom lens, and the ordinate indicates position of the focus lens. In this example, flange back adjustment is done by using a tracking curve for the focus length of 1 m.

As shown in FIG. 5, position of the focus lens 5 is first initialized. Specifically, position of the focus lens 5 is initialized at a position PI of a photo interrupter (step ST1).

Next, the zoom lens 3 is moved to a mechanical end ZMW on the wide side at a high speed. When the zoom lens 3 is brought to the mechanical end on the wide side, the zoom positional data then detected by the potentiometer 12 is taken as ZMW.

The focus lens 5 is controlled so that the zoom lens 3 is focalized at the mechanical end position on the wide side. When the focus lens 5 reaches the focal position, this position of the focus lens 5 is taken as FCS0 (step ST3).

Next, the focus lens 5 is moved by an amount FCS corresponding to a designed step amount from the optical wide end to the telephoto end for a subject distant by 1 m, and the focus lens 5 is located at (FCS0+FCS) (step ST4).

Additionally, the zoom lens 3 is moved from the mechanical end on the wide side toward the telephoto end, and a focal position is detected by moving the zoom lens 3. This position of the zoom lens 3 is stored as ZOT (step ST5).

Further, the zoom lens 3 is moved to the mechanical end on the telephoto end side. This position of the zoom lens 3 is stored as ZMT (step ST6).

An optical end ZOW on the wide side is obtained from the position ZMW of the zoom lens 3 at the mechanical end on the wide side, the position ZMT of the zoom lens 3 at the mechanical end on the telephoto side, and a ratio between the distance from the designed wide side mechanical end position to the telephoto side mechanical end position of the zoom lens 3 and the distance from the designed wide side optical end of the zoom lens 3 to the designed telephoto side optical end of the zoom lens 3 is obtained (step ST7).

Figure 7:
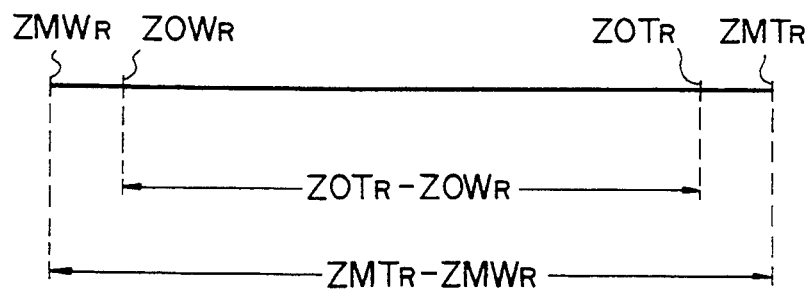
FIG. 7 is a schematic used for explanation of the embodiment of the invention.
Figure 8:
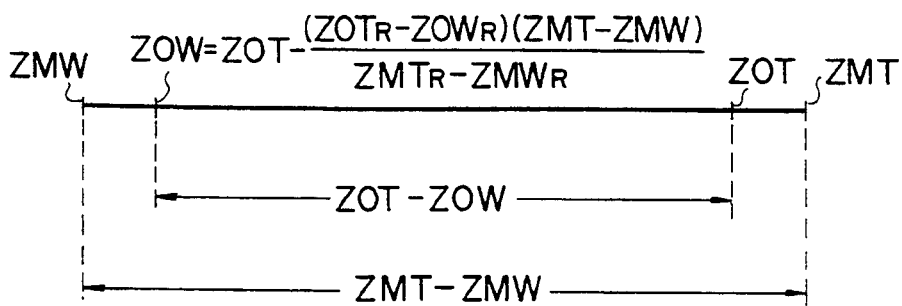
FIG. 8 is a schematic view used for explanation of the embodiment of the invention.

That is, as shown in FIG. 8, since the distance from the actual wide side mechanical end position ZMW of the zoom lens 3 to the telephoto side mechanical end position ZMT is (ZMT−ZMW), and the distance from the wide side optical end ZOW to the telephoto side optical end ZOT is (ZOT−ZOW), then the ratio between the distance (ZMT−ZMW) and the distance (ZOT−ZOW) is (ZMT−ZMW)/(ZOT−ZOW). Similarly, as shown in FIG. 7, since the distance from a designed wide side mechanical end position $ZMW_R$ of the zoom lens 3 to a telephoto side mechanical end position $ZMT_R$ is $(ZMT_R-ZMW_R)$, and the distance from the wide side optical end $ZOW_R$ to the telephoto side optical end $ZOT_R$ is $(ZOT_R-ZOW_R)$, then the ratio between the distance $(ZMT_R-ZMW_R)$ and the distance $(ZOT_R-ZOW_R)$ is $(ZMT_R-ZMWR)/(ZOT_R-ZOW_R)$. If both ratios are identical as follows:

$$(ZMT-ZMW)/(ZOT-ZOW)=(ZMT_R-ZMW_R)/(ZOT_R-ZOW_R)$$

then the wide side optical end ZOW is obtained as follows:

$$ZOW=ZOT-(ZOT_R-ZOW_R)(ZMT-ZMW)/(ZMT_R-ZMW_R)$$

Note that the wide side mechanical end position ZMW has been obtained in step ST2, and the telephoto side mechanical end position ZMT of the zoom lens 3 has been obtained in step ST6. Further, the ratio between the distance $(ZMT_R-ZMW_R)$ from the designed wide side mechanical end position $ZMW_R$ of the zoom lens 3 to the telephoto side mechanical end position $ZMT_R$ and the distance $(ZOT_R-ZOW_R)$ from the wide side optical end $ZOW_R$ to the telephoto side optical end $ZOT_R$ has been previously determined.

After the zoom lens 3 is once moved to the wide side mechanical end at a high speed, it is moved to the wide side optical end position ZOW (step ST8).

When the zoom lens 3 is brought to the wide side optical end position, it is held in the position, and focalization is carried out by the focus lens 5. Data on the present focal position of the lens is stored as FCS1 (step ST9).

The positional data FCS1 of the focus lens 5 is compared with the positional data FCS0 obtained in step ST3 to determine whether the difference is within a predetermined range (step ST10). If the difference is out of the predetermined range, the positional data FCS0 is replaced by the positional data FCS1 (step ST11), and control returns to step ST4 to repeat the same processing until the difference between the positional data FCS1 and the positional data FCS0 falls within the predetermined range.

If the difference is within the predetermined value, the present wide side optical end ZOW and the telephoto side optical end ZOT are stored (step ST12), and the flange back adjustment ends.

According to the invention, the wide side optical end is obtained from the wide side mechanical end position of the zoom lens, the telephoto side mechanical end position of the zoom lens, and the ratio between the distance from the designed wide side mechanical end position to the telephoto side mechanical end position and the distance from the wide side optical end to the designed telephoto side optical end. Thereby, flange back adjustment of a video camera using an inner focus lens assembly including a compensator lens can be automated.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A focus adjusting device for flange back adjustment of an inner focus lens assembly including a zoom lens, a focus lens, and a compensator lens, comprising:
   zoom lens driving means for driving said zoom lens;
   zoom lens position detecting means for detecting information on position of said zoom lens;
   focus lens driving means for driving said focus lens;
   focal condition detecting means for detecting a focal condition; and
   computing means, responsive to said zoom lens position detecting means and said focal condition detecting means and operatively connected with said zoom lens driving means and said focus lens driving means, for computing an optical end of said focus lens using (a) a predetermined ratio of the distance between opposite mechanical ends of said zoom lens to the distance between opposite optical ends of said zoom lens, and (b) a difference between the opposite mechanical ends of said zoom lens measured using said zoom lens position detecting means.

2. A focus adjusting device according to claim 1, wherein said driving means for driving said zoom lens is a DC motor.

3. A focus adjusting device according to claim wherein said zoom lens position detecting means is a potentiometer.

4. A focus adjusting device according to claim 1, wherein said focus lens driving means for driving said focus lens is a step motor.

5. A focus adjusting device according to claim 1, wherein said focal condition detecting means includes a high pass filter and a detecting circuit.

6. A focus adjusting device for flange back adjustment of an inner focus lens assembly including a zoom lens, a focus lens, and a compensator lens, comprising:
   zoom lens driving means for driving said zoom lens;
   zoom lens position detecting means for detecting information on position of said zoom lens;
   focus lens driving means for driving said focus lens;
   focal condition detecting means for detecting a focal condition; and
   computing means, responsive to said zoom lens position detecting means and said focal condition detecting means and operatively connected with said zoom lens driving means and said focus lens driving means, for selectively moving said zoom lens and said focus lens in a predetermined sequence including:
   moving the zoom lens to a mechanical end position (ZMW) on a wide side,
   moving the focus lens to a position (FCS0) wherein focus is achieved with the zoom lens at said wide side mechanical end,
   moving the focus lens by a predetermined amount (FCS) toward a telephoto end,
   moving the zoom lens to a position (ZOT) wherein focus is achieved, and
   moving the zoom lens to a mechanical end position (ZMT) at the telephoto end; and
   deriving the difference (ZMT−ZMW) between the wide side mechanical end position of the zoom lens and the telephoto side mechanical end position of the zoom lens using an output from said zoom lens position detecting means;
   using (a) a predetermined ratio of: (i) the difference between a designed wide side mechanical end of the zoom lens and a designed telephoto side mechanical end of the zoom lens, to (ii) the difference between a designed wide side optical end of the zoom lens and a designed telephoto optical end of the zoom lens, (b) the difference (ZMT−ZMW) between the determined wide side mechanical end of the zoom lens and the determined telephoto side mechanical end of the zoom lens, and (c) the determined (ZOT) position, to derive a wide side optical end (ZOW) position for the zoom lens;
   determining if the difference between the derived wide side optical end position (ZOW) and the (FSCO) position, falls within a predetermined range; and
   recording the (ZOW) and (ZOT) values if the difference between (ZOW) and (FSCO) falls within the predetermined range.

* * * * *